(No Model.)

E. A. THUSTON.
VEHICLE WHEEL.

No. 477,473. Patented June 21, 1892.

Witnesses
W. N. H. Knight
Arthur L. Bryant

Inventor
Eli A. Thuston
By his Attorneys
Edson Bros.

United States Patent Office.

ELI ALICK THUSTON, OF AVONDALE, ALABAMA.

VEHICLE-WHEEL.

SPECIFICATION forming part of Letters Patent No. 477,473, dated June 21, 1892.

Application filed February 19 1892. Serial No. 422,108. (No model.)

*To all whom it may concern:*

Be it known that I, ELI ALICK THUSTON, a citizen of the United States, residing at Avondale, in the county of Jefferson and State of Alabama, have invented certain new and useful Improvements in Vehicle-Wheels; and I do hereby declare the following to be a full, clear, and exact description of the invention, such as will enable others skilled in the art to which it appertains to make and use the same.

My invention relates to improvements in vehicle-wheels of that class which employ a wrought-metal rim and spokes and a cast-metal hub; and the objects of the invention are, first, to provide a simple, strong, and durable wheel, and, secondly, to provide a wheel in which the spokes will not become loosened by the wearing away of the rim and on which a hub can be cast without destroying the circular contour of the wheel or drawing the spokes inwardly in radial lines from the rim.

With these ends in view my invention consists in the combination, with a wrought-metal rim provided with a series of oval or elliptical apertures having their longest diameter transverse to the face of the rim, of wrought-metal spokes having their inner ends made smooth and tapering and their outer ends pressed in suitable dies to form shoulders and make the ends conform to the shape of the apertures in the rim and a hub of cast metal.

My invention further consists in the peculiar construction and arrangement of parts, as will be hereinafter more fully pointed out and claimed.

Figure 1:
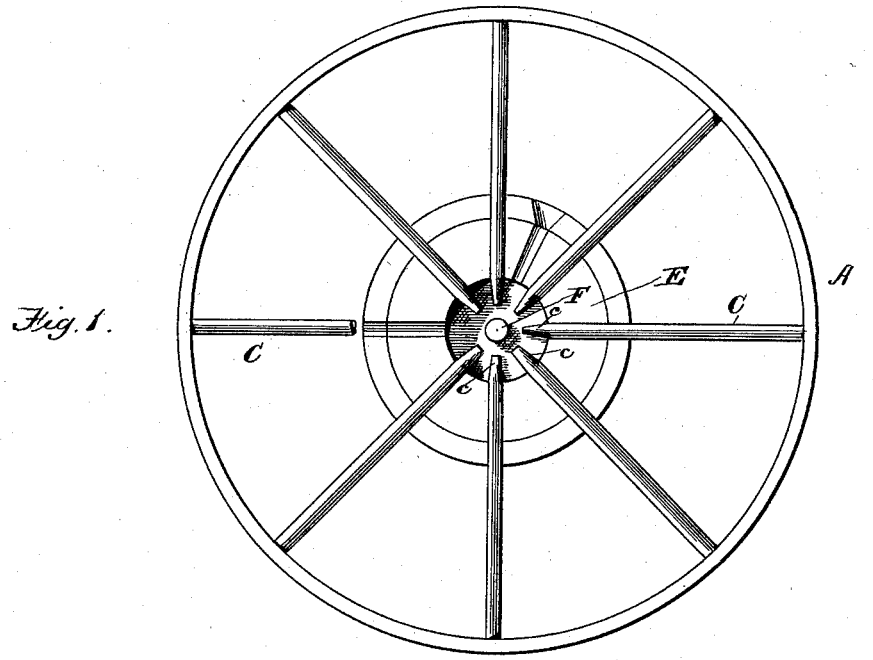
Figure 2:
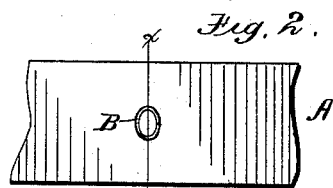
Figure 3:
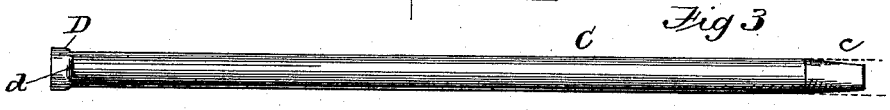
Figure 4:
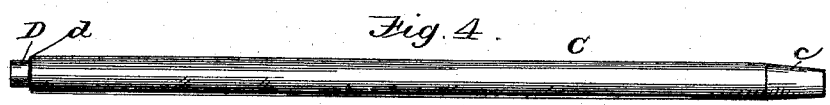
Figure 5:

In the accompanying drawings, Figure 1 is a plan view showing the rim and spokes in position to have the hub cast on the inner ends of the spokes. Fig. 2 is a detail view of a section of the rim. Figs. 3 and 4 are detail views of one of the spokes, and Fig. 5 is a sectional view on the line $x\ x$ of Fig. 2.

Like letters of reference denote corresponding parts in the several figures of the drawings, referring to which—

A designates the rim of my improved wheel, which is preferably formed of wrought metal, and said rim is provided with a series of equidistant apertures B. Each of the apertures B is made oval or elliptical in shape, the greatest diameter of said apertures being transverse to the length of the rim A. The apertures B are preferably formed by means of tapering punches or dies entering the metal from the outer surface of the rim, so that said apertures are of greater size at the outer surface than at the inner surface thereof, as is shown in Fig. 5. The spokes C are also preferably formed from wrought metal and have their inner ends $c$ made tapering and smooth. The outer ends of the spokes C are provided with tenons D. These tenons are formed by pressing the outer ends of the spokes C in suitable dies to form the shoulders $d$ and at the same time give the spoke the proper set. In forming the tenon on the spoke in this manner there is no stretch or strain on the metal forming the spoke, the shoulders being pressed out on the sides and leaving the oval or elliptical tenon as strong as the body of the spoke.

The tenons D are slightly longer than the diameter of the spoke, so as to project slightly beyond the body of the spoke, as shown in Fig. 3. The tenons on the outer end of the spokes are fitted into the apertures in the rim, to which they conform in shape, and are secured in place by riveting in the ordinary manner. By making the apertures B in the rim A tapering, as shown in Fig. 5, the spoke cannot become loose by reason of the rim wearing away slightly.

The inner tapering ends of the spokes C are inserted in suitable apertures or recesses formed in a mold E, and molten metal is poured into such mold around a suitable core F and the inner ends of the spokes.

The core F is preferably formed of a steel pin, which is coated with shellac, and before the latter is dried the pin is dusted with plumbago or parting sand, (which shellac and plumbago increases the size of the core,) and when the same is removed or burned off by the action of the hot metal the pin F can be easily withdrawn.

By making the inner ends of the spokes C tapering and smooth they are permitted to draw or contract somewhat as the hub cools, and thus prevent destroying the curve of the rim A.

By forming the apertures B so that the greatest length thereof is transverse to the face of the rim the strongest part of the tenon on the spoke is subjected to the cross strain on the wheel.

In some cases instead of coating the core F with shellac and plumbago I simply pour the molten metal to form the hub about the steel pin and leave the same in the hub, the ends of the pin extending a short distance beyond the hub to serve as journals to support the wheel.

I am aware that changes in the form and proportion of parts and details of construction of the devices herein shown and described as an embodiment of my invention can be made without departing from the spirit or sacrificing the advantages thereof, and I therefore reserve the right to make such changes as fairly fall within the scope of my invention.

Having thus fully described my invention, what I claim as new, and desire to secure by Letters Patent, is—

A vehicle-wheel consisting of a wrought-metal rim provided with a series of equidistant tapering apertures, the longest diameter of which extends transversely of the rim, a series of wrought-metal spokes, each having one end compressed to form a tenon which is of greater length than the diameter of the spoke and conforms to the shape of the apertures in the rim, the other ends of the spokes being perfectly smooth and tapering, and a cast-metal hub engaging the inner tapering ends of the spokes, substantially as described.

In testimony whereof I affix my signature in presence of two witnesses.

ELI ALICK THUSTON.

Witnesses:
F. M. FRAZIER,
P. G. GORE.